(12) United States Patent
Alexander et al.

(10) Patent No.: US 9,934,149 B2
(45) Date of Patent: Apr. 3, 2018

(54) PREFETCH MECHANISM FOR SERVICING DEMAND MISS

(71) Applicant: QUALCOMM Incorporated, San Diego, CA (US)

(72) Inventors: Khary Jason Alexander, Austin, TX (US); Eric Francis Robinson, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 15/087,649

(22) Filed: Mar. 31, 2016

(65) Prior Publication Data

US 2017/0286303 A1 Oct. 5, 2017

(51) Int. Cl.
*G06F 12/08* (2016.01)
*G06F 12/0862* (2016.01)
*G06F 12/0811* (2016.01)
*G06F 12/0891* (2016.01)
*G06F 12/0897* (2016.01)

(52) U.S. Cl.
CPC ...... *G06F 12/0862* (2013.01); *G06F 12/0811* (2013.01); *G06F 12/0891* (2013.01); *G06F 12/0897* (2013.01); *G06F 2212/6022* (2013.01); *G06F 2212/62* (2013.01)

(58) Field of Classification Search
None
See application file for complete search history.

(56) References Cited

U.S. PATENT DOCUMENTS

| 6,073,215 A | 6/2000 | Snyder |
| 8,725,987 B2 | 5/2014 | Jones et al. |
| 8,909,866 B2 | 12/2014 | Kalamatianos et al. |
| 9,047,198 B2 | 6/2015 | Kannan et al. |
| 9,098,418 B2 | 8/2015 | Kannan et al. |
| 2011/0078380 A1* | 3/2011 | Gendler .............. G06F 12/0862 711/122 |
| 2014/0317356 A1* | 10/2014 | Srinivasan .......... G06F 12/0862 711/137 |
| 2015/0199275 A1* | 7/2015 | Radhakrishnan ... G06F 12/0862 711/137 |
| 2016/0070651 A1 | 3/2016 | Shwartsman et al. |

FOREIGN PATENT DOCUMENTS

EP 0069250 A2 1/1983

OTHER PUBLICATIONS

International Search Report and Written Opinion—PCT/US2017/021916—ISA/EPO—dated Jun. 20, 2017.

* cited by examiner

*Primary Examiner* — Duc Doan
(74) *Attorney, Agent, or Firm* — Muncy, Geissler, Olds & Lowe, P.C.

(57) ABSTRACT

Systems and methods relate to servicing a demand miss for a cache line in a first cache (e.g., an L1 cache) of a processing system, for example, when none of one or more fill buffers for servicing the demand miss are available. In exemplary aspects, the demand miss is converted to a prefetch operation to prefetch the cache line into a second cache (e.g., an L2 cache), wherein the second cache is a backing storage location for the first cache. Thus, servicing the demand miss is not delayed until a fill buffer becomes available, and once a fill buffer becomes available, the prefetched cache line is returned from the second cache to the available fill buffer.

30 Claims, 4 Drawing Sheets

PREFETCH MECHANISM FOR SERVICING DEMAND MISS

FIELD OF DISCLOSURE

Disclosed aspects pertain to processing systems comprising one or more levels of caches. More specifically, exemplary aspects are directed to utilizing prefetch mechanisms for servicing demand misses to a cache.

BACKGROUND

Processing systems may comprise one or more levels of caches, configured, for example between a processor and a main memory. The processor may first access a level one cache (or "L1 cache"), and if there is a miss in the L1 cache for a cache line, a level two cache (or "L2 cache"), if available, may be consulted. If there is also a miss in the L2 cache for the cache line, a level three cache (or "L3 cache"), if available, may be consulted, and so on, until the cache line is found in a backing storage location such as a cache or main memory.

A processing system may implement several resources for servicing the various cache misses which may occur. To take advantage of instruction-level and memory-level parallelism, a plurality of resources may be provided to support servicing multiple cache misses at the same time. For example, buffers known as fill buffers may be provided for servicing cache misses in an L1 cache. The fill buffers may receive cache lines (e.g., missing cache lines from one or more backing storage locations), and the cache lines may be installed in the L1 cache from the fill buffers. There may be a limited number of ports through which the L1 cache may be accessed, and so, arbitration may be performed between cache lines held in multiple fill buffers before the cache lines are installed into the L1 cache. As can be appreciated, the resources provided (e.g., number of ports, the number of fill buffers, etc.) for servicing the L1 cache misses may be bounded by area and power considerations, as well as timing considerations (e.g., the latency incurred by possible arbitration processes which may be involved in servicing multiple L1 cache misses).

In situations such as a context switch, the L1 cache, for example, may experience a large burst in the number of cache requests, and correspondingly, the number of cache misses. While it is desirable to service the burst of cache misses quickly and efficiently (e.g., taking advantage of memory-level parallelism), conventional processing systems may only be able to service a limited number of cache misses at any given time due to the limited number of fill buffers and related resources available for servicing the cache misses. Any additional cache misses may be stalled until the fill buffers and other resources for servicing the additional cache misses become available.

Accordingly, the conventional processing systems are seen to be deficient in efficiently handling such situations (e.g., context switches) where the fill buffers and related resources, for example, are unavailable or busy and additional cache misses are waiting to be serviced. There is a corresponding need in the art to overcome these deficiencies.

SUMMARY

Exemplary aspects of the invention are directed to systems and methods for servicing a demand miss to a first cache (e.g., an L1 cache) of a processing system, for example, when fill buffers for servicing the demand miss are unavailable. In exemplary aspects, the demand miss is converted to a prefetch operation for a second cache (e.g., an L2 cache), wherein the second cache is a backing storage location for the first cache.

For example, an exemplary aspect is direct to a method of cache access in a processing system, the method comprising determining that there is a first demand miss for a first cache line in a first cache, and when no fill buffer is available to service the first demand miss, converting the first demand miss into a prefetch operation for prefetching the first cache line into a second cache.

Another exemplary aspect is direct to an apparatus comprising a first cache, one or more fill buffers configured to service demand misses to the first cache and a second cache. The apparatus further comprises logic configured to convert a first demand miss for a first cache line in the first cache to a prefetch operation, to prefetch the first cache line into the second cache if none of the one or more fill buffers are available to service the first demand miss.

Yet another exemplary aspect is direct to an apparatus comprising a first cache, one or more means for servicing demand misses in the first cache, a second cache; and means for converting a first demand miss for a first cache line in the first cache, to a prefetch operation for prefetching the first cache line into the second cache if none of the one or more means for servicing are available.

Still another exemplary aspect is direct to non-transitory computer-readable storage medium comprising code, which, when executed by a processor, causes the processor to perform operations for accessing a cache, wherein the non-transitory computer-readable storage medium comprises code for determining that there is a first demand miss for a first cache line in a first cache, and code for converting the first demand miss into a prefetch operation for prefetching the first cache line into a second cache when no fill buffer is available to service the first demand miss.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Figure 1:
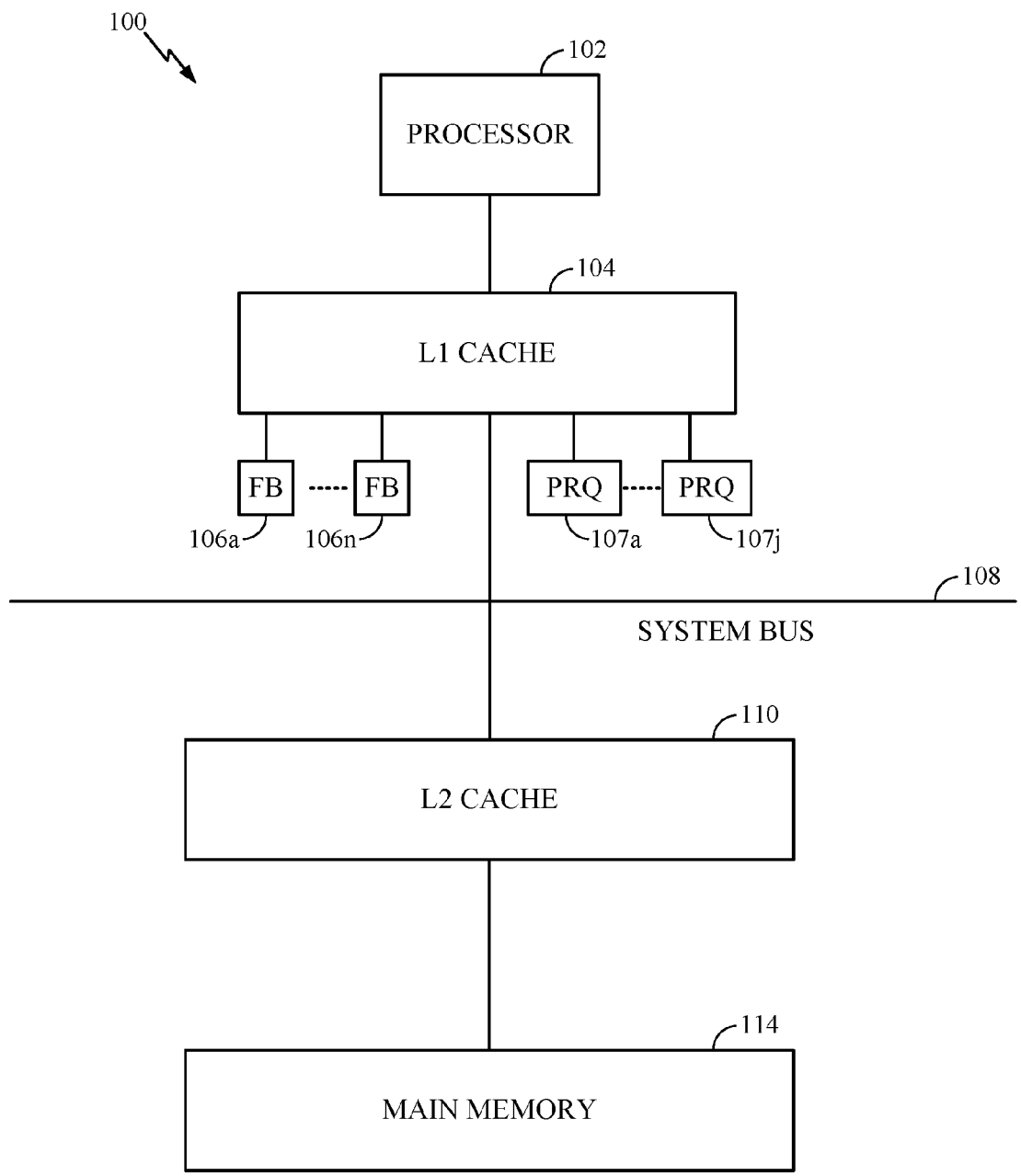
FIG. 1 depicts an exemplary block diagram of a processor system according to aspects of this disclosure.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In exemplary aspects, if fill buffers for servicing L1 cache misses are busy or unavailable (e.g., if there is a context switch) to service a demand miss in the L1 cache for a cache line, then the demand miss may be converted into a prefetch request. In one aspect, converting the demand miss into a prefetch operation can involve the use of a storage medium which is referred to herein as a prefetch request queue (PRQ). One or more PRQs may be available in the processing system, which are normally used for holding addresses of cache lines which are to be prefetched into the L2 cache (based on conventional prefetch mechanisms). In case the fill buffers for servicing the demand miss to the L1 cache are unavailable, a PRQ may be repurposed (if already available) or otherwise configured for servicing the demand miss according to exemplary aspects described herein. A demand miss address corresponding to the demand miss may be stored in the repurposed PRQ, following which, a missing cache line may be brought in from the demand miss address at a backing storage location to the L2 cache (assuming the cache line is not already present in the L2 cache). Once at least one fill buffer becomes available to service the demand miss, the missing cache line can be filled in to the L1 cache using the later available fill buffer. In this manner, servicing the demand miss may be initiated by prefetching the missing cache line into the L2 cache before the fill buffer becomes available, thus reducing the latency of servicing the demand miss.

With reference now to FIG. 1, a block diagram of an exemplary processing system 100 is illustrated. Processing system 100 may comprise one or more processors, of which processor 102 has been particularly identified. Processor 102 can have an associated cache which may be local to processor 102 and depicted as L1 cache 104. One or more additional caches like L1 cache 104 may also be present in processing system 100 (e.g., associated with other processors, but not explicitly shown). L1 cache 104 (and, where present, one or more additional L1 caches) may be coupled to L2 cache 110 via a network or system bus 108. L2 cache 110 may be configured as a backing storage for L1 cache 104 (as well as one or more additional L1 caches, if present). Although not illustrated, processing system may also include an L3 cache and one or more other backing storage locations. As shown, L2 cache 110 may be coupled to main memory 114.

In exemplary aspects, L1 cache 104 may include resources such as one or more fill buffers, representatively illustrated as n fill buffers (FB) 106$a$-$n$ for servicing cache misses and holding data before the data is filled in to L1 cache 104. Fill buffers 106$a$-$n$ may receive data or cache lines from backing storage locations such as L2 cache 110, to be placed into L1 cache 104. Fill buffers 106$a$-$n$ can receive one cache line each to be filled into L1 cache 110, so up to n cache lines may be present in the n fill buffers 106$a$-$n$. Depending on how many write ports exist in L1 cache 104, a process of arbitration may be employed to write the cache lines from fill buffers 106$a$-$n$ into L1 cache 104.

Additionally, one or more, (e.g., a number j) prefetch request queues (PRQs) 107$a$-$j$ may also be provided for L1 cache 104. Under normal operating conditions, PRQs 107$a$-$j$ may have a traditional role of storing prefetch addresses (e.g., received from a prefetch address generator or prefetch instructions issued by processor 102) for prefetching cache lines from the prefetch addresses prior to demands for the prefetch addresses being issued by processor 102. In exemplary aspects, one or more PRQs 107$a$-$j$ may be repurposed or configured as temporary storage locations for storing addresses of cache lines which miss in L1 cache 104 if none of the n fill buffers 106$a$-$n$ are available for servicing the misses for these cache lines in L1 cache 104. Compared to fill buffers 106$a$-$n$ which are configured to hold entire cache lines, for example, PRQs 107$a$-$j$ may not hold data, but only hold addresses. Thus, each one of PRQs 107$a$-$j$ may be much smaller in size in comparison to each one of fill buffers 106$a$-$n$. Accordingly, even if one or more PRQs 107$a$-$j$ are not already present in processing system 100 (e.g., for performing their traditional prefetch roles), adding one or more PRQs 107$a$-$j$ according to exemplary aspects would not incur a significant increase in hardware (or viewed another way, adding a PRQ would incur less hardware than adding a fill buffer would entail). The addresses from PRQs 107$a$-$j$ may be forwarded to prefetch mechanisms (not explicitly shown) for prefetching cache lines from these addresses into L2 cache 110.

Various prefetch mechanisms and algorithms for prefetching cache lines are known in the art, and so they will not be discussed in detail herein. Conventionally, prefetching cache lines may be based on determining memory access patterns, for example. As previously mentioned, a prefetch address generator (e.g., implemented as a hardware module in processor 102, but not explicitly shown) may be configured to determine strides or memory address separations between consecutive memory accesses, for example, and based on these strides, generate prefetch addresses. Additionally, or alternatively, prefetch addresses may also be generated by software, e.g., from instructions executed by processor 102. Conventionally, cache lines may be prefetched and placed in L2 cache 110 (keeping in mind that L2 cache 110 may also have fill buffers or other associated mechanisms for receiving cache lines before they are installed in L2 cache 110, but these mechanisms have not been particularly illustrated or exhaustively explained, for the sake of brevity. Accordingly, for conventional prefetch operations, if and when a demand miss is encountered for the prefetched cache lines in L1 cache 104, for example, the prefetched cache lines will be present in L2 cache 110 and can be transferred to L1 cache 104 (assuming at least one fill buffer 106a-n is available).

In exemplary aspects, if none of fill buffers 106a-n are available when a demand miss is encountered in L1 cache 104, then the demand miss is converted to a prefetch request which can also cause a cache line to be prefetched into L2 cache 110, in addition to or in lieu of conventional prefetch operations described above.

In an exemplary aspect, converting a demand miss for a cache line in L1 cache 104, when none of FBs 106a-n are available, to a prefetch request, can entail forwarding a miss address of the missing cache line to one of PRQs 107a-j. According to exemplary aspects, forwarding a miss address of the missing cache line to one of PRQs 107a-j initiates the process of converting the demand miss to a prefetch operation. In some aspects, the miss address may be directly supplied from PRQs 107a-j to prefetch mechanisms for prefetching into L2 cache 110. In some aspects, L2 cache 110 can be first checked to see if the missing cache line is already present, and if the missing cache line is present, then an unnecessary prefetch of the missing cache line may be avoided. From L2 cache 110, the missing cache line can be returned to L1 cache 104 once at least one FB 106a-n becomes available.

Converting the demand miss to a prefetch operation in this manner can improve latency of servicing the demand miss. Example timelines for servicing the demand miss in L1 cache 104 with and without utilization of PRQs 107a-j are shown in FIG. 2, to illustrate the latency improvements which are possible in exemplary aspects.

Figure 2:
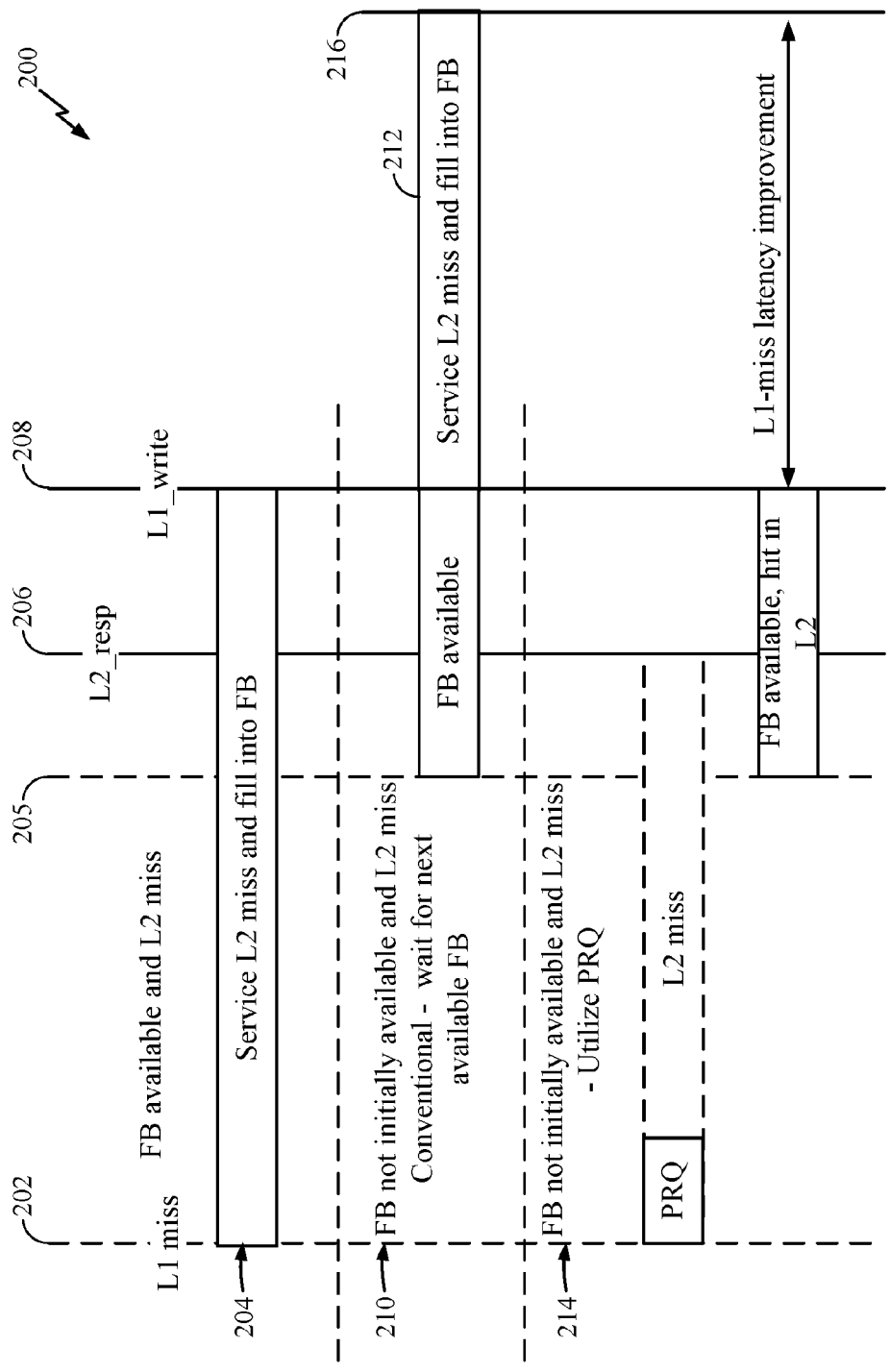
FIG. 2 illustrates a timing diagram for cache management according to aspects of this disclosure.

In FIG. 2, timing diagram 200 includes timelines 204, 210, and 214 for example operations of processing system 100 shown in FIG. 1. For all of timelines 204, 210, and 214, it is assumed that processor 102 makes a demand (or request) for reading a cache line, namely, a first cache line, from L1 cache 104, but at time 202 it is determined that there is a demand miss in L1 cache 104 for the first cache line. It is also assumed for all of timelines 204, 210, and 214 that L2 cache 110 also does not contain the first cache line and so there will be a miss in L2 cache 110 as well for the first cache line (otherwise, there would be no need to use prefetch mechanisms to bring the first cache line into L2 cache 110 according to exemplary aspects). Further details of timelines 204, 210, and 214 will now be provided in the following sections with combined reference to FIGS. 1-2.

Timeline 204 pertains to a scenario where at least one of the n fill buffers 106a-n is available for servicing the demand miss at time 202. L2 cache 110 is consulted and since there is a miss in L2 cache 110 also for the first cache line, the miss in L2 cache 110 is serviced to bring the first cache line into L2 cache 110 (although not shown, fill buffers for L2 cache 110 may be used for receiving the first cache line from a backing storage location such as main memory 114 and installing the first cache line into L2 cache 110 after a process of arbitration, where applicable). At time 206, L2 cache 110 provides a response comprising the first cache line to the at least one available fill buffer of fill buffers 106a-n and at time 208, after processes such as arbitration among the remaining fill buffers 106a-n, for example, the first cache line is written into L1 cache 104. Thereafter, the first cache line may be returned to processor 102 according to techniques known in the art.

Timeline 210 pertains to a conventional implementation, for example, where none of the n fill buffers 106a-n are available for servicing the demand miss at time 202, and exemplary aspects of converting the demand miss to a prefetch operation into L2 cache 110 are not applicable. In this case, at time 205, at least one of fill buffers 106a-n may become available for servicing the demand miss for the first cache line. Thereafter, time duration 212 may be incurred for consulting L2 cache 110, determining a miss in L2 cache 110 for the first cache line, and then servicing the miss in L2 cache 110, returning the first cache line from L2 cache 110 to the available fill buffer, and writing the first cache line from the available fill buffer to L1 cache 104. Accordingly, the process of servicing the L1 cache miss determined at time 202 may be completed at time 216.

Referring now to timeline 214, an exemplary aspect of converting the demand miss to a prefetch operation for L2 cache 110 (e.g., utilizing one or more PRQs 107a-j) when none of the n fill buffers 106a-n are available for servicing the demand miss at time 202 is illustrated. In timeline 214, once a miss in L1 cache 104 is determined at time 202, a prefetch of the first cache line into L2 cache 110 is started without waiting for at least one fill buffer of the n fill buffers 106a-n to become available. A first address corresponding to the first cache line may be temporarily stored in one of PRQs 107a-j, from where the first address may be provided to a prefetch engine, for example, for prefetching the first cache line into L2 cache 110. By time 205, when at least one fill buffer of the n fill buffers 106a-n becomes available, the first cache line is already in L2 cache 110, and therefore, from this point on, timeline 214 resembles timeline 204 wherein at least one of the n fill buffers 106a-n was available at time 202. More specifically in timeline 214, following time 205, when at least one fill buffer of the n fill buffers 106a-n becomes available, a hit in L2 cache 110 is determined for the first cache line and thereby, L2 cache 110 provides a response by returning the first cache line to the available fill buffer at time 206, and after arbitration, the first cache line is written to L1 cache 104 at time 208. As can be appreciated, exemplary aspects of writing the first cache line to L1 cache 104 in timeline 214 can occur at time 208, thus improving latency by at least time duration 212 in comparison with timeline 210.

In some aspects, interfaces between L1 cache 104 and L2 cache 110 may support instructions or operations to flexibly enable or disable the use of PRQs 107a-j or other means for converting the demand misses which cannot be readily serviced by L1 cache 104 due to lack of availability of resources such as fill buffers 106a-n to prefetch operations for L2 cache 110, according to exemplary aspects discussed above (e.g., with reference to timeline 214 of FIG. 2). In exemplary aspects, up to j additional demand misses to L1 cache 104, i.e., up to the number of PRQs 107a-j provided in processing system 100, may be serviced if fill buffers 106a-n are unavailable.

Some example mechanisms and processes which may be utilized in returning the first cache line which was prefetched into L2 cache 110 to one of fill buffers 106a-n which later becomes available (e.g., at time 205 in timeline 214) will now be explained. In general, transfer of the first cache line from L2 cache 110 to fill buffers 106a-n may be pursuant to a demand miss for the first cache line in L1 cache 104 being forwarded to L2 cache 110. Accordingly, utilizing PRQs 107a-j to convert the demand miss to a prefetch of the first cache line into L2 cache 110 can be initiated at time 202 when a demand miss for the first cache line in L1 cache 104 occurs. Pursuant to the original demand miss not having been serviced, the demand for the first cache line may be replayed by processor 102. When the demand for the first cache line is replayed, there will once again be a miss for the first cache line in L1 cache 104, following which, if one of fill buffers 106a-n is available and the first cache line has been prefetched into L2 cache 110, the first cache line can be read from L2 cache 110 into the available one of fill buffers 106a-n, thereby servicing the replayed demand miss.

If none of fill buffers 106a-n are available to service even the replayed demand miss then different processes may follow based on particular implementations. In one implementation, one of PRQs 107a-j used for prefetching the first cache line into L2 cache 110 may have been retired (e.g., released or disassociated from holding the first address of the first cache line, so that the released PRQ 107a-j may be made available for temporarily storing the address of another missing cache line or a prefetch address) after the first address is forwarded to the prefetch mechanisms for prefetching the first cache line into L2 cache 110. Thus, when the demand for the first cache line is replayed, then a similar method as previously discussed may be followed by converting the replayed demand miss into a prefetch operation by once again using one of PRQs 107a-j. However, this time, the first cache line is likely to be present in L2 cache 110, so a prefetch operation, if initiated, can be completed without having to engage prefetch mechanisms to fetch data related to the first cache line. Rather, once one of fill buffers 106a-n becomes available, the first cache line can be returned to the available one of fill buffers 106a-n.

In another implementation, one of PRQs 107a-j (referred to herein as the associated PRQ, for ease of description) used for prefetching the first cache line into L2 cache 110 may remain active (not retired) and continue to hold the first address, in anticipation for the demand for the first cache line being replayed. Thus, when the demand for the first cache line is replayed and if none of fill buffers 106a-n are available, the address of the replayed demand will match the first address of the original demand held in the still-active associated PRQ. Pursuant to this match, it can be determined that a prefetch operation is already in progress for the first cache line and therefore, will not need to be initiated once again. Servicing the replayed demand miss for the first cache line can then be combined with the prefetch operation. When one of fill buffers 106a-n becomes available to handle the replayed demand, the associated PRQ 107 will no longer be needed (e.g., to communicate that a new prefetch operation to L2 cache 110 has already been initiated) and therefore the may be retired.

In some aspects, fill buffers 106a-n may be monitored and when one of fill buffers 106a-n becomes available, the available fill buffer 106a-n may be reserved (referred to herein as the reserved fill buffer, for ease of description) for servicing the demand miss for the first cache line. This may include recording an identity of the associated PRQ in the reserved fill buffer. Once the first cache line is prefetched into L2 cache 110, the first cache line can be forwarded directly to the reserved fill buffer. In this manner, forwarding the first cache line directly to the reserved fill buffer can be performed in some aspects, without a demand miss for the first cache line being replayed. In some aspects, forwarding the first cache line directly to the reserved fill buffer may involve notifying L2 cache 110 that one of fill buffers 106a-n has been reserved to accept a cache line for a request that was previously made via a prefetch operation using one or PRQs 107a-j (e.g., the associated PRQ) rather than through the process of servicing a demand miss via one or fill buffers 106a-n. Notifying L2 cache 110 can include forwarding an identification of the reserved fill buffer to L2 cache 110. Thus, when L2 cache 110 forwards the first cache line to fill buffers 106a-n, L2 cache 110 may include the identity of the reserved fill buffer to direct the first cache line to be filled into the reserved fill buffer. Alternatively, when L2 cache 110 forwards the first cache line to fill buffers 106a-n, L2 cache 110 may include an identification of the associated PRQ with the first cache line, based on which, identity of the reserved fill buffer to which the first cache line is to be sent to can be determined (e.g., the reserved fill buffer may have the identity of the associated PRQ recorded therein).

Furthermore, some aspects are directed to ensuring that the first cache line which is prefetched into L2 cache 110 (pursuant to a demand miss in L1 cache 104 when none of the n fill buffers 106a-n are available to service the demand miss) is retained in L2 cache 110 until the first cache line is returned to L1 cache 104 pursuant to a fill buffer 106a-n becoming available later. Retention of the first cache line in L2 cache 110 may be affected by replacement policies for cache lines in L2 cache 110. If a least recently used (LRU) policy as known in the art is used for cache line replacement when L2 cache 110 is full (or a particular way or set comprising the first cache line is full), there is a danger of the first cache line being evicted before it is returned to the later available fill buffer. To avoid unintended eviction of the first cache line, prefetched cache lines such as the first cache line may be marked (e.g., with hints or special tags) as cache lines that are not to be replaced until they are returned to a fill buffer of L1 cache 104. For example, the cache lines prefetched in to L2 cache 110 pursuant to a demand miss for the cache lines in L1 cache 104 may be marked in L2 cache 110 as pending a demand read in case options for replaying the demand miss for the prefetched cache lines are used. Marking the prefetched cache lines in L2 cache 110 in this manner may be implemented by selectively marking prefetched cache lines in L2 cache 110 whose addresses correspond to addresses for which demand misses were realized in L1 cache 104.

Although the above aspects have been described with the examples of servicing demand misses for L1 cache 104 by prefetching cache lines corresponding to the demand misses into L2 cache 110, exemplary aspects can be extended to any cache levels. For example, exemplary aspects may more generally pertain to servicing a demand miss of a first cache line in a first cache, by prefetching the first cache line into a second cache, wherein demand miss servicing mechanisms such as fill buffers for the first cache may be unavailable. Thus, an exemplary aspect may also pertain to servicing a demand miss of a second cache line in L2 cache 110 wherein fill buffers (not shown) for L2 cache 110 may be unavailable, by prefetching the second cache line into an L3 cache (not shown), wherein the L3 cache may be a backing storage for L2 cache 110.

Figure 3:
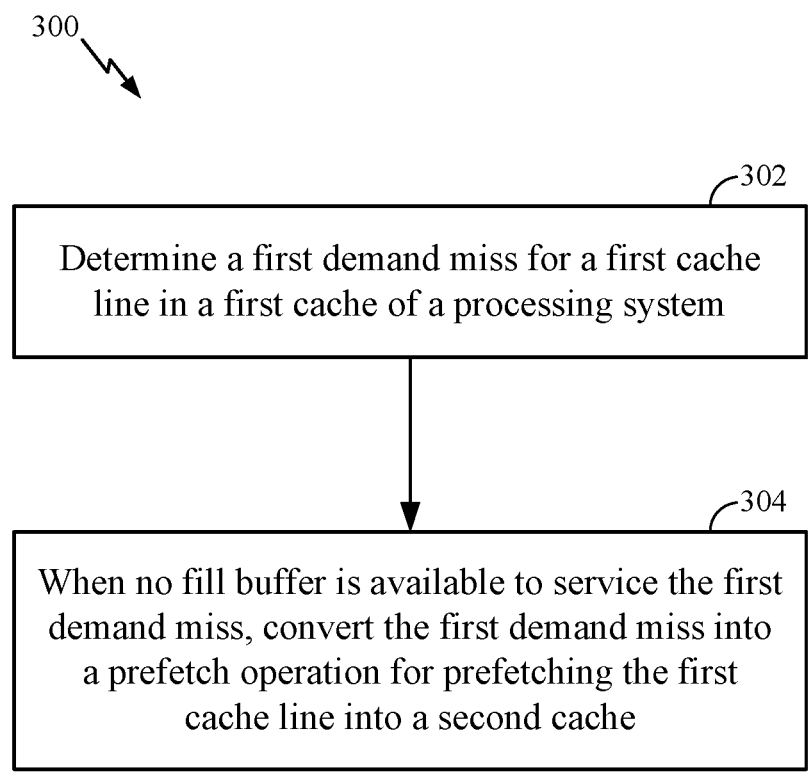
FIG. 3 depicts an exemplary method for cache management according to aspects of this disclosure.

Accordingly, it will be appreciated that exemplary aspects include various methods for performing the processes, functions and/or algorithms disclosed herein. For example, FIG. 3 illustrates a method 300 of performing cache access in a processing system (e.g., processing system 100).

For example, as shown in Block 302, method 300 comprises determining a first demand miss for a first cache line in a first cache (e.g., L1 cache 104) of the processing system. For example, the first demand miss may be based on a demand (e.g., a read request) for the first cache line generated by processor 102 of processing system 100.

In Block 304, when no fill buffer is available (e.g., none of fill buffers 106a-n are available) to service the first demand miss, servicing the first demand miss is converted to a prefetch operation for prefetching the first cache line into a second cache (e.g., using one of PRQs 107a-j for holding a first address of the first cache line and for forwarding the first address to prefetch mechanisms for prefetching the first cache line into L2 cache 110).

In exemplary aspects, when a fill buffer becomes available to service the first demand miss, method 300 can further comprise returning the first cache line to the fill buffer from the second cache, and writing the first cache line from the fill buffer to the first cache, for example, based on arbitration among one or more fill buffers in the processing system.

Furthermore, method 300 can also involve marking the first cache line prefetched into the second cache as a cache line for servicing a demand miss, to avoid or delay eviction of the first cache line from the second cache before the first cache line is returned to the fill buffer.

It will also be appreciated that exemplary aspects of this disclosure are directed to means for performing the functions described herein. For example, an exemplary aspect can include an apparatus (e.g., processing system 100) comprising: a first cache (e.g., L1 cache 104), one or more means for servicing demand misses in the first cache (e.g., fill buffers 106a-n) and a second cache (e.g., L2 cache 110). The apparatus can comprise means for converting (e.g., PRQs 107a-j or other means for holding a first address of the first cache line) a first demand miss for a first cache line in the first cache, to a prefetch operation (e.g., using a prefetch engine or other means for prefetching the first cache line from the first address into the second cache) for prefetching the first cache line into the second cache if none of the one or more means for servicing are available. The apparatus can further comprise means for returning the first cache from the second cache to a means for servicing, when the means for servicing becomes available (e.g., using the various techniques discussed herein such as monitoring if one of fill buffers 106a-n becomes available and returning the first cache line to the available or reserved fill buffer, for example).

Figure 4:
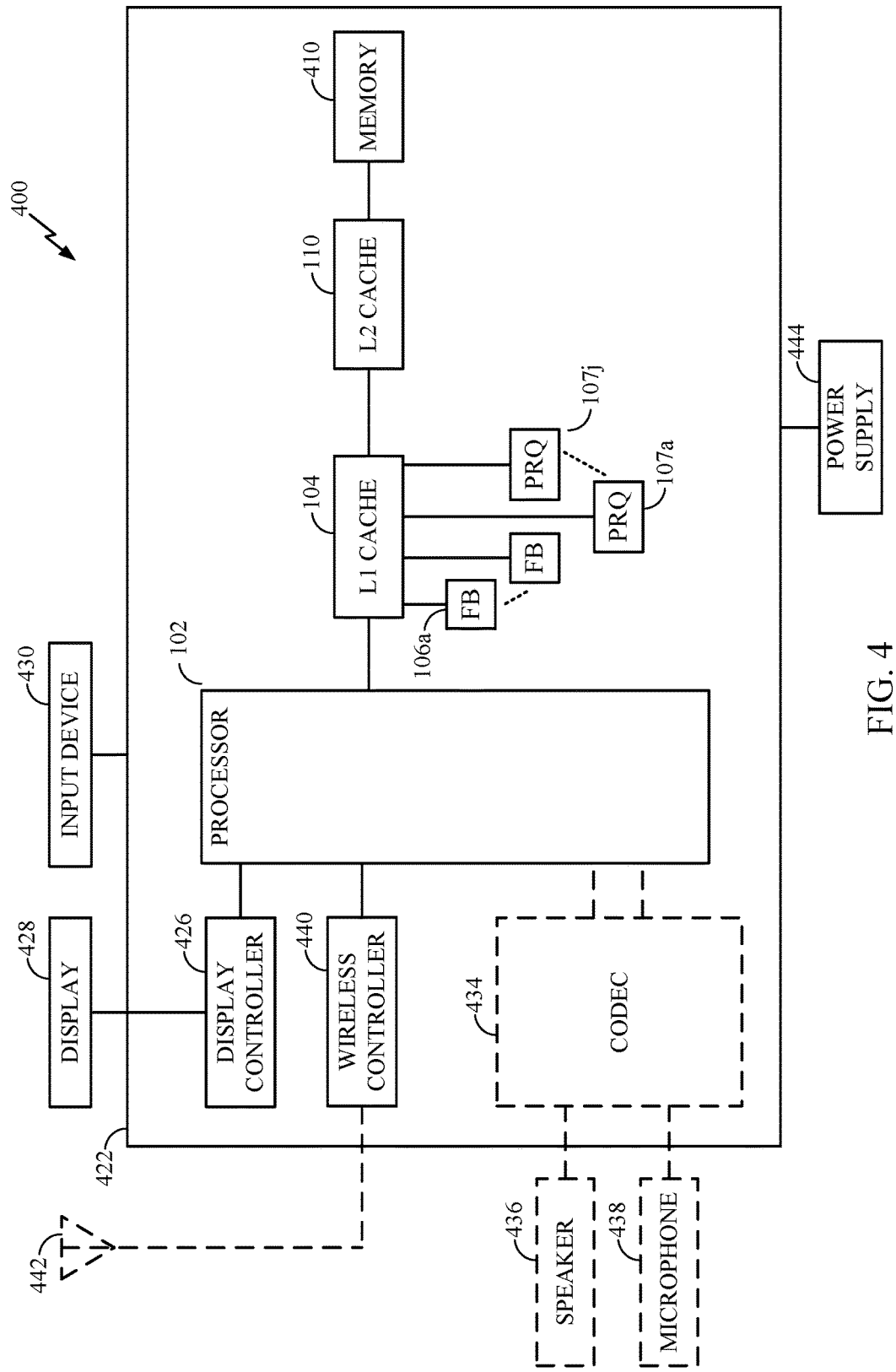
FIG. 4 depicts an exemplary computing device in which an aspect of the disclosure may be advantageously employed.

An example apparatus in which exemplary aspects of this disclosure may be utilized, will now be discussed in relation to FIG. 4. FIG. 4 shows a block diagram of computing device 400. Computing device 400 may correspond to an implementation of processing system 100 shown in FIG. 1 and configured to perform method 300 of FIG. 3. In the depiction of FIG. 4, computing device 400 is shown to include processor 102, L1 cache 104 with fill buffers 106a-n and PRQs 107a-j, and L2 cache 110 (which may be configured as discussed with reference to FIG. 1). Further details of the components discussed with reference to FIG. 1 have been omitted from FIG. 4, for the sake of clarity. Memory 410 of computing device 400 may be similarly configured as main memory 114 discussed in relation to FIG. 1. In FIG. 4, processor 102 is exemplarily shown to be coupled to memory 410 with two levels of caches comprising L1 cache 104 and L2 cache 110, but it will be understood that other memory configurations known in the art may also be supported by computing device 400.

FIG. 4 also shows display controller 426 that is coupled to processor 102 and to display 428. In some cases, computing device 400 may be used for wireless communication and FIG. 4 also shows optional blocks in dashed lines, such as coder/decoder (CODEC) 434 (e.g., an audio and/or voice CODEC) coupled to processor 102 and speaker 436 and microphone 438 can be coupled to CODEC 434; and wireless antenna 442 coupled to wireless controller 440 which is coupled to processor 102. Where one or more of these optional blocks are present, in a particular aspect, processor 102, display controller 426, memory 410, and wireless controller 440 are included in a system-in-package or system-on-chip device 422.

Accordingly, a particular aspect, input device 430 and power supply 444 are coupled to the system-on-chip device 422. Moreover, in a particular aspect, as illustrated in FIG. 4, where one or more optional blocks are present, display 428, input device 430, speaker 436, microphone 438, wireless antenna 442, and power supply 444 are external to the system-on-chip device 422. However, each of display 428, input device 430, speaker 436, microphone 438, wireless antenna 442, and power supply 444 can be coupled to a component of the system-on-chip device 422, such as an interface or a controller.

It should be noted that although FIG. 4 generally depicts a computing device, processor 102 and memory 410, may also be integrated into a set top box, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for servicing a demand miss for a first cache using prefetch mechanisms for a second cache. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of cache access in a processing system, the method comprising:
   determining that there is a first demand miss for a first cache line in a first cache; and
   when no fill buffer is available to service the first demand miss, converting the first demand miss into a prefetch operation for prefetching the first cache line into a second cache before the first cache line misses in the second cache,
   wherein the processing system comprises at least one or more fill buffers associated with the first cache, the one or more fill buffers configured to temporarily hold data for cache lines which encounter a demand miss in the first cache before the data is filled in to the first cache.

2. The method of claim 1, further comprising returning the first cache line from the second cache to a fill buffer, when the fill buffer becomes available.

3. The method of claim 2, further comprising writing the first cache line from the fill buffer to the first cache.

4. The method of claim 2, further comprising marking the first cache line with a hint to not be replaced or evicted from the second cache until the first cache line is returned to the fill buffer.

5. The method of claim 1, wherein converting the first demand miss into the prefetch operation comprises holding a first address of the first cache line in a prefetch request queue (PRQ), and forwarding the first address from the PRQ to prefetch mechanisms for prefetching the first cache line into the second cache.

6. The method of claim 5, comprising releasing the PRQ from holding the first address after forwarding the first address to the prefetch mechanisms.

7. The method of claim 5, comprising retaining the PRQ for holding the first address until a fill buffer becomes available to service a second demand miss for the first cache line encountered by the first cache.

8. The method of claim 5, comprising storing prefetch addresses generated by a prefetch engine in the PRQ, when the PRQ is not holding the first address.

9. The method of claim 1, wherein the first cache is a L1 cache and the second cache is a L2 cache.

10. The method of claim 1, wherein no fill buffer is available to service the first demand miss when one or more fill buffers of the processing system are busy servicing other demand misses to the first cache.

11. The method of claim 1, wherein the second cache is a backing storage of the first cache.

12. An apparatus comprising:
   a first cache;
   one or more fill buffers configured to service demand misses to the first cache, the one or more fill buffers configured to temporarily hold data for cache lines which encounter the demand miss in the first cache before the data is filled in to the first cache;
   a second cache; and
   logic configured to convert a first demand miss for a first cache line in the first cache to a prefetch operation, to prefetch the first cache line into the second cache before the first cache line misses in the second cache, if none of the one or more fill buffers are available to service the first demand miss.

13. The apparatus of claim 12, the first cache line is returned from the second cache to a fill buffer of the one or more fill buffers, when the fill buffer becomes available.

14. The apparatus of claim 13, wherein the first cache line is marked with a hint to not to be replaced or evicted from the second cache until the first cache line is returned to the fill buffer.

15. The apparatus of claim 12, wherein the logic configured to convert the first demand miss for the first cache line in the first cache comprises a prefetch request queue (PRQ) configured to hold a first address of the first cache line and to forward the first address from the PRQ to prefetch mechanisms configured to prefetch the first cache line into the second cache.

16. The apparatus of claim 15, wherein the PRQ does not hold the first address after the first address is forwarded to the prefetch mechanisms.

17. The apparatus of claim 15, wherein the first address is held in the PRQ until a fill buffer becomes available to service a second demand miss for the first cache line encountered by the first cache.

18. The apparatus of claim 15, wherein the PRQ is further configured to store prefetch addresses generated by a prefetch engine, when the first address is not held in the PRQ.

19. The apparatus of claim 15, wherein a size of the PRQ is smaller than any one of the one or more fill buffers.

20. The apparatus of claim 12, wherein the first cache is a L1 cache and the second cache is a L2 cache.

21. The apparatus of claim 12, wherein the second cache is a backing storage of the first cache.

22. The apparatus of claim 12, integrated into a device selected from the group consisting of a set top box, a music player, a video player, an entertainment unit, a navigation device, a personal digital assistant (PDA), a fixed location data unit, a computer, a laptop, a tablet, a communications device, and a mobile phone.

23. An apparatus comprising:
   a first cache;
   one or more means for servicing demand misses in the first cache, by temporarily holding data for cache lines which encounter the demand miss in the first cache before the data is filled in to the first cache;
   a second cache; and
   means for converting a first demand miss for a first cache line in the first cache, to a prefetch operation for prefetching the first cache line into the second cache before the first cache line misses in the second cache, if none of the one or more means for servicing are available.

24. The apparatus of claim 23, further comprising means for returning the first cache from the second cache to a means for servicing, when the means for servicing becomes available.

25. The apparatus of claim 23, wherein the means for converting comprises a means for holding a first address of the first cache line and means for prefetching the first cache line from the first address into the second cache.

26. The apparatus of claim 25, wherein a size of the means for holding is smaller than a size of the means for servicing.

27. A non-transitory computer-readable storage medium comprising code, which, when executed by a processor, causes the processor to perform operations for accessing a cache, wherein the non-transitory computer-readable storage medium comprises:

code for determining that there is a first demand miss for a first cache line in a first cache; and code for converting the first demand miss into a prefetch operation for prefetching the first cache line into a second cache before the first cache line misses in the second cache, when no fill buffer is available to service the first demand miss, wherein at least one or more fill buffers associated with the first cache are configured to temporarily hold data for cache lines which encounter a demand miss in the first cache before the data is filled in to the first cache.

28. The non-transitory computer-readable storage medium of claim 27, further comprising code for returning the first cache line from the second cache to a fill buffer, when the fill buffer becomes available.

29. The non-transitory computer-readable storage medium of claim 28, further comprising code for marking the first cache line with a hint to not to be replaced or evicted from the second cache until the first cache line is returned to the fill buffer.

30. The non-transitory computer-readable storage medium of claim 27, comprising code for holding a first address of the first cache line in a prefetch request queue (PRQ), and code for forwarding the first address from the PRQ to prefetch mechanisms for prefetching the first cache line into the second cache.

\* \* \* \* \*